United States Patent
Lin

(10) Patent No.: US 6,473,529 B1
(45) Date of Patent: Oct. 29, 2002

(54) SUM-OF-ABSOLUTE-DIFFERENCE CALCULATOR FOR MOTION ESTIMATION USING INVERSION AND CARRY COMPENSATION WITH FULL AND HALF-ADDERS

(75) Inventor: Tao Lin, Fremont, CA (US)

(73) Assignee: NeoMagic Corp., Santa Clara, CA (US)

( * ) Notice: Subject to any disclaimer, the term of this patent is extended or adjusted under 35 U.S.C. 154(b) by 0 days.

(21) Appl. No.: 09/432,367

(22) Filed: Nov. 3, 1999

(51) Int. Cl.[7] .............................. G06K 9/36; G06F 7/52
(52) U.S. Cl. ........................ 382/236; 382/232; 708/630
(58) Field of Search ................................ 382/232, 234, 382/239, 247, 278, 281, 24 D; 348/699, 416, 402, 700, 701, 407; 708/201, 490, 274, 552, 551, 553, 700, 705, 491, 708, 710, 630

(56) References Cited

U.S. PATENT DOCUMENTS

| | | | |
|---|---|---|---|
| 4,218,751 A | 8/1980 | McManigal | 708/201 |
| 4,887,233 A | 12/1989 | Cash et al. | 708/625 |
| 4,910,701 A * | 3/1990 | Gibbons et al. | 708/630 |
| 5,105,379 A | 4/1992 | Smith | 708/705 |
| 5,511,017 A | 4/1996 | Cohen et al. | 708/491 |
| 5,745,397 A | 4/1998 | Nadehara | 708/552 |
| 5,835,389 A | 11/1998 | Wong | 708/201 |
| 5,862,065 A | 1/1999 | Muthusamy | 708/521 |

* cited by examiner

Primary Examiner—Andrew W. Johns
Assistant Examiner—Duy M. Dang
(74) Attorney, Agent, or Firm—Stuart T. Auvinen

(57) ABSTRACT

A specialized Sum-of-Absolute-Difference (SAD) calculator for motion estimation uses inversion rather than 2's complementing. The absolute-value operation of each pixel-pair difference is performed by a bit-wise inversion rather than a complement. This reduces delay since the adder/incrementer propagation is eliminated. The increment needed to adjust for inversion rather than 2's complementing is accomplished by using the carry inputs to the summing and final adders that generate the sum of the absolute differences. When 2-input final adders are used for summing, a total of k–1 adders are used to sum k absolute differences. One additional increment is needed since only k–1 adders are available. A reduced half-adder rather than a full adder is inserted between the summing and final adder for this remaining increment. Propagation of carries between bit positions in a full adder can be avoided using the half adder. The final adder generates the final sum (the SAD) by adding the sum and carry bits from the half-adder array and propagating the carries.

20 Claims, 7 Drawing Sheets

SUM-OF-ABSOLUTE-DIFFERENCE CALCULATOR FOR MOTION ESTIMATION USING INVERSION AND CARRY COMPENSATION WITH FULL AND HALF-ADDERS

FIELD OF THE INVENTION

This invention relates to digital-video compression systems, and more particularly to motion-estimation calculators.

BACKGROUND OF THE INVENTION

Personal computers, digital-video cameras, and newer consumer electronic devices commonly use video in a digital format. Since a huge amount of memory or storage space is required to fully store all 30 or more frames per second of video, the images are usually compressed. Often sequential images in the video sequence differ only slightly. The difference from a previous (or following) image in the sequence can be detected and encoded, rather than the entire picture. Such lossy compression techniques are widely used, such as MPEG encoding.

During compression or encoding, each frame or image is divided into a grid of macroblocks. Each macroblock contains 16×16 pixels. A macroblock from a current frame or picture is compared to a range of macroblocks in a previous picture in the video sequence. Often a match or near-match is found at a different location. The difference in locations is known as a motion vector, since it indicates the movement of the macroblock between the two pictures. The motion vector rather than the entire macroblock can then be encoded for the new picture, saving storage space.

FIG. 1 illustrates motion estimation for a pair of digital-video pictures. A current picture 10 is compared to an old picture 12 in a video sequence. Old picture 12 could occur either before or after current picture 10 in the sequence when backward and forward estimation are used.

Macroblock 16 in current picture 10 is selected and compare to all macroblocks within search range 14 in old picture 12. A match or near-match is found with macroblock 16'. because of movement of subjects in the pictures, macroblock 16' from old picture 12 has moved to a new location in current picture 10. The difference in locations of macroblocks 16, 16' is indicated by motion vector 18.

Rather than store all 16×16 pixels of macroblock 16 in the encoded video stream, only motion vector 18 and an identifier for macroblock 16' need to be included. This reduces or compresses the size of the video stream.

Although the video stream is compressed, large numbers of calculations are needed for motion estimation. The various macroblocks within a search range are usually evaluated by a sum of the absolute difference (SAD) method. The macroblock 16' with the smallest SAD is the closest match to the macroblock 16 being searched.

For a search range of +/−127 and +/−63 pixels, a total of 32K macroblocks are evaluated, requiring 32K SAD operations. Each SAD operation requires 256 (16×16) subtractions, 256 absolute-value operations, and 255 2-input additions, a total of 767 arithmetic operations. A full search for one macroblock thus requires 32K×767 or about 24M calculations.

A 720×480-pixel picture has 1350 macroblocks, each of which may move independently and thus must be motion-estimated. So a total of 1350×24M or 32G calculations are needed per picture. For a video having 30 frames per second, about 1 trillion operations per second are needed (1T ops/sec). Thus full motion estimation requires large computing resources.

While a general-purpose arithmetic-logic-unit (ALU) or digital-signal processor (DSP) can be used for performing the SAD operations, a specialized calculator for these SAD operations is desirable. A specialized SAD calculator that reduces the processing time of the frequent SAD operations would improve compression performance.

Sum-of-Absolute-Difference Calculations—FIG. 2

FIG. 2 shows a straightforward approach to performing the Sum-of-Absolute-difference (SAD) operation. When comparing 2 macroblocks for motion estimation, a measure of the visual differences between the 2 macroblocks is obtained by comparing pixels. Different numeric values of the pixels are used to represent different colors and shades. Each pixel in one macroblock can be compared to the corresponding pixel in the other macroblock by subtracting the numeric values of the 2 pixels. When the pixels are identical, the difference is zero. Pixels that differ only slightly in color will have a small difference. Since the difference can be either positive or negative, the absolute value of the difference is taken.

The difference and absolute values of all other pairs of pixels in the 2 macroblocks are also generated. Finally, all of the absolute differences are summed to obtain one data value that represents the overall difference between the 2 macroblocks. The closer this sum is to zero, the better the 2 macroblocks match. When many possible macroblock pairs are compared in this way, the macroblock with the smallest sum is the best match. The motion vector is then the location difference between the 2 macroblocks.

In FIG. 2, macroblock A with pixels A1, A2, A3, A4 . . . is being compared to macroblock B with pixels B1, B2, B3, B4 . . . . Pixel A1 corresponds to pixel B1, pixel A3 to B3 etc, since each pair of pixels is in the same relative location within the macroblocks being compared. Subtractors 20 each receive an A pixel value and a B pixel value and generated the difference. A full adder with a 2's complementor can be used for subtractor 20 if the 2's complement of the B pixel is taken prior to its being input to the adder.

Subtractors 20 thus generate the pixel differences A1-B1, A2-B2, A3-B3, and A4-B4. The most-significant-bit (MSB) of each difference output from adders 20 is the sign bit. When the sign bit is zero, the difference is positive, and mux 24 selects the output from adder 20 as the absolute difference. However, when the sign bit (MSB) is a one, the difference from subtractor 20 is negative, and the 2's complement of the difference is selected by mux 24. The 2's complement of each difference is generated by negation logic 22. Negation logic 22 inverts all bits in the difference and adds one to obtain the 2's complement.

Muxes 24 thus output only positive values, since negative differences from adders 20 are negated by negation logic 22 and selected by mux 24, while positive differences are passed through mux 24 unchanged.

Final adders 26, 28, 30 perform the summing function, generating the sum of all the absolute differences output from muxes 24. Additional final adders and absolute-difference subtractors 20 can be added for comparing more pixels at a time. The final output from adder 30 represents the SAD for the four pairs of pixels compared.

Full adders or faster adders can be used for the final adders, such as described by Cash et al. in U.S. Pat. No. 4,887,233. Other kinds of absolute-difference generators can be used for each pair of pixel inputs, such as the absolute difference generator described by McManigal in U.S. Pat. No. 4,218,751.

FIG. 3 shows negation logic for generating the 2's complement. Negation logic 22 inverts all bits of input IN using inverters 32. This is a bit-wise inversion. For example, input 010011 is inverted by inverters 32 to 101100. Adder 34 then adds 1 to the bit-inverted input from inverters 32. For example, the value 101100 from inverters 32 is incremented by adder 34 to produce output OUT of 101101, which is the 2's complement of input IN.

FIG. 4 shows that the increment for 2's complementation can be performed by a downstream adder using the carry-in. Adder 38 and inverters 36 perform a subtraction operation, generating A-B. Input B is inverted bit-by-bit using inverters 36, and the bit-wise inversion of B (B') is input to adder 38. Input A is applied directly to the other input of adder 38.

Adder 38 would normally generated A+B'. However, the carry-in CIN to the least-significant-bit (LSB) is set to one. Setting the carry-in to 1 effectively adds one to the sum. Adder 38 thus generates A+B'+1. Since the 2's complement of B (-B) is B'+1, adder 38 outputs A-B.

What is desired is a sum-of-absolute-difference calculator for use with a video compressor. It is desired to use a dedicated, specialized arithmetic unit to generate the sum of absolute differences (SAD) of pixel pairs in 2 macroblocks being compared for motion estimation searches. It is desired to reduce logic paths and circuit propagation delays in a SAD calculation circuit. reduction of logic stages in the SAD unit is desired.

SUMMARY OF THE INVENTION

A Sum-of-Absolute-Difference (SAD) calculator has a plurality of k pixel-pair inputs. Each pixel-pair input includes a first pixel input receiving a first pixel from a first macroblock and a second pixel input that receives a second pixel from a second macroblock. A plurality of k subtractors each generates a difference by subtracting a numeric value of the second pixel from a numeric value of the first pixel.

A plurality of k inverter banks is each coupled to the difference from one of the k subtractors, to generate bit-inverted differences. A plurality of k muxes, each receive a difference from one of the k subtractors and a bit-inverted difference from an inverter bank that receives the difference.

A sign bit for each difference is generated by each subtractor. The sign bit indicates when a difference represents positive or a negative value.

Each mux in the plurality of muxes is controlled by a sign bit for the difference input to the mux. Each mux outputs the difference when the sign bit indicates that the difference represents a positive value, but each mux outputs the bit-inverted difference when the sign bit indicates that the difference represents a negative value.

A plurality of k–2 summing adders each has 2 multi-bit inputs and a single-bit carry input. A first level of the summing adders receive outputs from the plurality of muxes. The plurality of summing adders output a first partial sum and a second partial sum. Each of the k–2 summing adders receives as the single-bit carry input a sign bit for a different one of the differences. The k–2 summing adders compensate for bit-wise inversion rather than 2's complementing of all but 2 of the differences.

A half-adder array receives the first and second partial sums from the plurality k–2 summing adders. It generates a sum and a carry bit for each bit position by adding each bit position of the first partial sum to a same bit position of the second partial sum. The half-adder array outputs all sum bits as a sums output and all carry bits as a carries output.

A final adder has 2 multi-bit inputs and a single-bit carry input. It receives the sums output and the carries output from the half-adder array. The final adder receives at the single-bit carry input the sign bit for a difference generated by one of the k subtractors. The final adder sums the sum and carry bits output by the half-adder array with the sign bit and propagates carries to generate a SAD value. The SAD value is a sum of absolute-values of the differences generated by the k subtractors.

Thus the k–2 summing adders compensate for bit-wise inversion rather than 2's complementing of all but 2 of the differences, while the final adder and the half-adder array compensate for a remaining 2 of the differences.

In further aspects the half-adder array does not propagate carries among bit positions but merely outputs carries to the final adder. Thus carries are propagated by the final adder but not by the half-adder array. The half-adder array has a faster propagation delay than does the final adder. The half-adder array has a plurality of half-adder cells; each half-adder cell is unconnected to other half-adder cells. Thus half-adder cells operate independently of other half-adder cells.

In further aspects of the invention, for each pixel-pair input, the first pixel is at a first relative location within the first macroblock and the second pixel is at a second relative location within the second macroblock. Thus the first and second relative locations are a same relative location within a macroblock.

BRIEF DESCRIPTION OF THE DRAWINGS

FIG. 4 shows that the increment for 2's complementation can be performed by a downstream adder using the carry-in.

DETAILED DESCRIPTION

The present invention relates to an improvement in motion estimation. The following description is presented to enable one of ordinary skill in the art to make and use the invention as provided in the context of a particular application and its requirements. Various modifications to the preferred embodiment will be apparent to those with skill the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that inversion rather than 2's complementing can be used in a specialized Sum-of- Absolute-Difference (SAD) calculator for motion estimation. Using a bit-wise inversion rather than a complement for the absolute-value operation reduces delay since the adder/incrementer propagation is eliminated. The inventor has further realized that the increment to adjust for inversion rather than complementing can be accomplished by using the carry inputs to the final summing adders that generate the sum of the absolute differences. When 2-input final adders are used for summing, a total of k−1 adders are used to sum k absolute differences. One additional increment is needed since only k−1 adders are available. The inventor realizes that a reduced half-adder rather than a full adder can be used for this remaining increment. Thus the propagation of carries between bit positions in a full adder can be avoided using the half adder.

Figure 1:
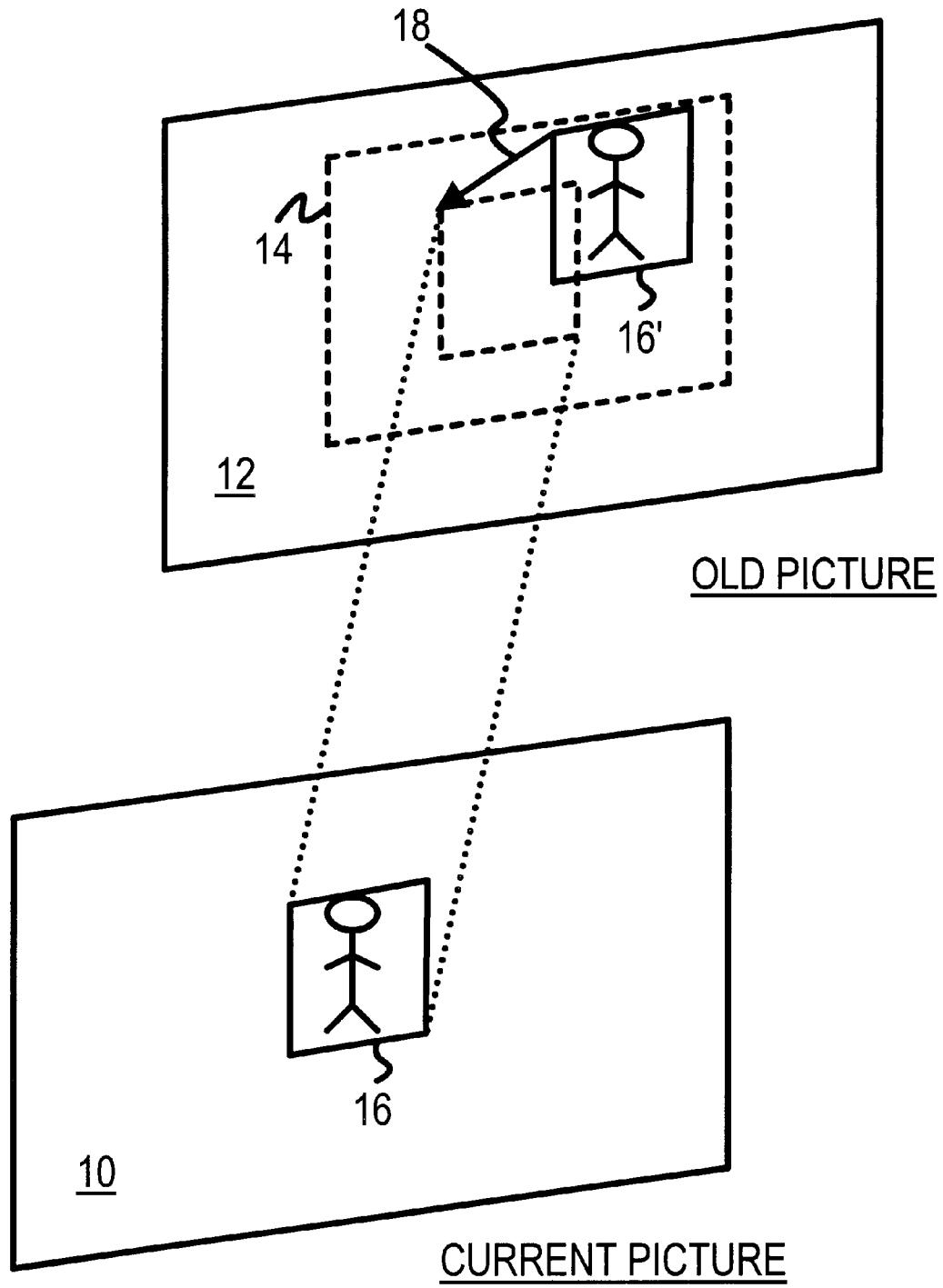
FIG. 1 illustrates motion estimation for a pair of digital-video pictures.
Figure 2:
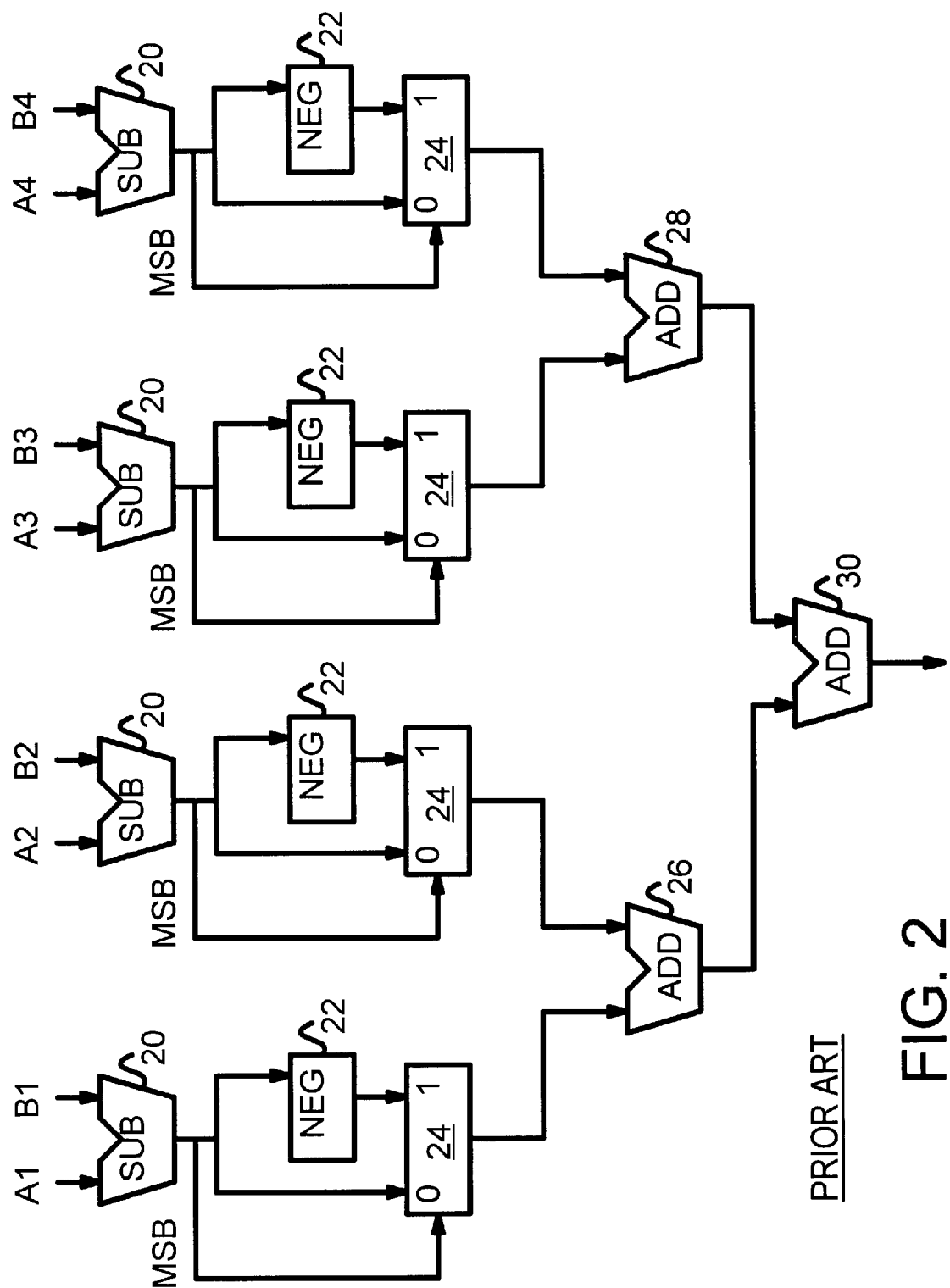
FIG. 2 shows a straightforward approach to performing the Sum-of-Absolute-difference (SAD) operation.
Figure 3:
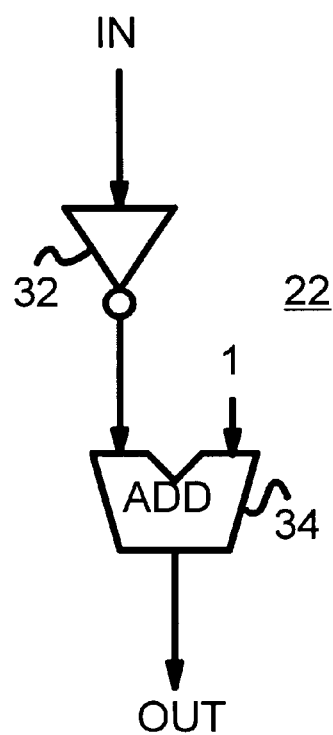
FIG. 3 shows negation logic for generating the 2's complement.
Figure 4:
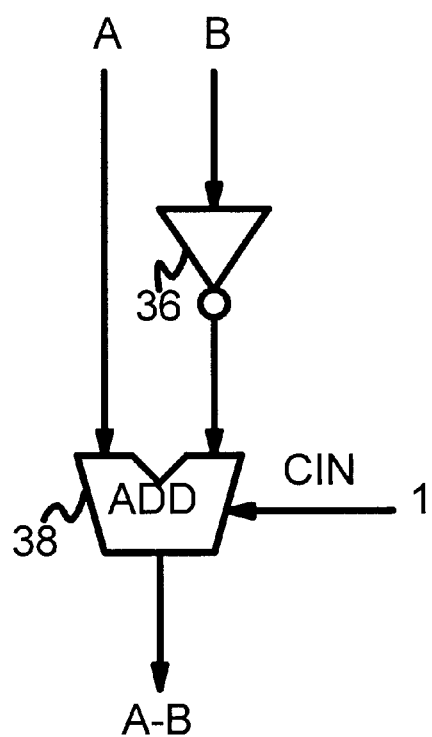
Figure 5:
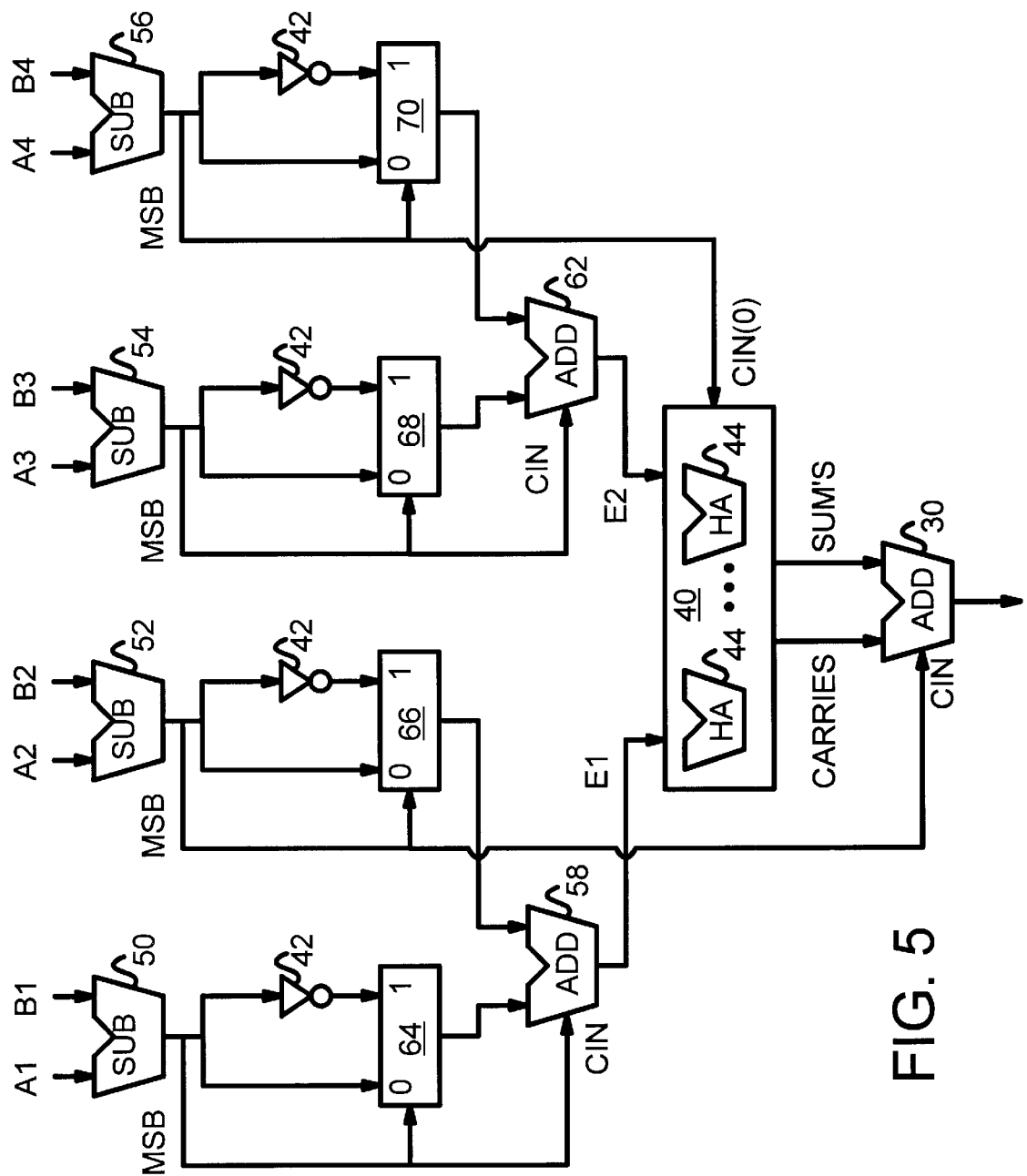
FIG. 5 shows a Sum-of-Absolute-Difference calculator using inversion rather than complement with increment compensation in the adders.

FIG. 5 shows a Sum-of-Absolute-Difference calculator using inversion rather than complement with increment compensation in the final adders. Subtractors 50, 52, 54, 56 each receive an A pixel input from macroblock A and a B pixel from macroblock B. Subtractor 50 generates A1-B1, subtractor 52 generates A2-B2, subtractor 54 generates A3-B3, and subtractor 56 generates A4-B4. Bit-wise inversion of the differences from subtractors 50–56 are performed by inverters 42.

The most-significant-bit (MSB) of the pixel difference A1-B1 from subtractor 50 is applied to the control input of multiplexer or mux 64. When the MSB sign bit is zero, the non-inverted difference is passed through mux 64 since it is a positive number. When the M sign bit is one, the difference from subtractor 50 represents a negative number, and the bit-wise-inverted difference from inverter 42 is selected by mux 64. Thus mux 64 outputs A1-B1 when positive, or the bit-wise inversion (A1-B1)' when the difference is negative.

Muxes 66, 68, 70 operate in a similar fashion as mux 64, passing positive differences through but selecting bit-wise inverted differences from inverters 42 when negative.

When a difference is negative, the bit-wise inversion performed by inverters 42 is not exactly equal to the 2's complement that is needed for the absolute value. Since the 2's complement differs from the bit-wise inversion by one, a binary one must be added whenever a negative difference is inverted.

Final Adders Compensate for all Except One Difference

Final adders 58, 62, 30 sum the pixel differences from muxes 64, 66, 68, 70. These are full carry-propagate adders or equivalent. Each adder has a carry-in CIN input that adds a one in the lowest bit-position. Although a fixed one could be applied to each carry-in input, the MSB sign bit of the difference is applied to the carry-in input. This dynamically applies a 1 to the carry in when the difference was negative and inverted by mux 64, but applies a 0 to the carry in when the difference was positive and no inversion occurs.

For example, the MSB of the difference A1-B1 from subtractor 50 is applied to both mux 64 and the carry-in of final adder 58. When the difference A1-B1 is negative, the MSB is a 1 and mux 64 selects the inversion (A1-B1)'. The MSB is also connected to the carry-in input of final adder 58, causing an additional 1 to be added to the sum from adder 58. Thus the inversion for A1-B1 is compensated for by final adder 58.

The difference A3-B3 is similarly compensated for by applying the MSB sign bit of the difference from subtractor 54 to both mux 68 and to the carry-in CIN input of final adder 62.

Since there is only one carry-in input to each adder 58, 62, only one of the two differences summed by the adder can be compensated. The other difference must be compensated for by another adder. For example, final adder 58, which adds the differences (A1-B1) and (A2-B2) from subtractors 50, 52, compensates for inversion of difference A1-B1 from subtractor 50, but not for difference A2-B2 from subtractor 52. Final adder 62 compensates for difference A3-B3 but not for difference A4-B4.

The sum E1 from adder 58 is added to the sum E2 from adder 62 in final adder 30, producing one final sum. Final adder 30 also has a carry-in CIN input, which receives the MSB sign bit from difference A2-B2 from subtractor 52.

Only one difference is not yet compensated for, difference A4-B4 from subtractor 56. Half-adder array 40 is used to compensate for inversion of A4-B4. Half-adder array 40 contains half adder cells 44, which generate carry and sum bits for each bit-position, but do not propagate carries. Half-adder array 40 receives sums E1 and E2 from final adders 58, 62 for each bit position. Half-adder array 40 adds each bit-position of E1 to E2 to gate a carry and sum bit for that bit-position. Half-adder array 40 also receives the MSB sign bit of A4-B4 as a carry-in to the LSB. This carry is not propagated.

The carry bits and the sum bits from half-adder array 40 are applied to the two inputs of final adder 30, which propagates the carries and generates the final sum. Thus all differences are compensated for by the carry inputs to the final adders, or by the additional half-adder array. Since inversion is used by inverters 42 rather than full complementing, an incrementing adder is avoided for each difference term.

When the positive pixels A1, B1, A2, etc have a bit-width of n bits, the differences from subtractors 50–56 have one more bit (n+1 bits), but only the n LSB's are inverted by inverters 42 since the MSB is the sign bit. Muxes 64–70 can truncate the MSB since it is zero after inversion and must be zero for the absolute value. Final adders 58, 62 generate n+1 bit sums E1, E2, while half-adder array 40 generates n+2 sum bits and n+2 carry bits. Final adder 30 outputs n+2 bits.

Figure 6:
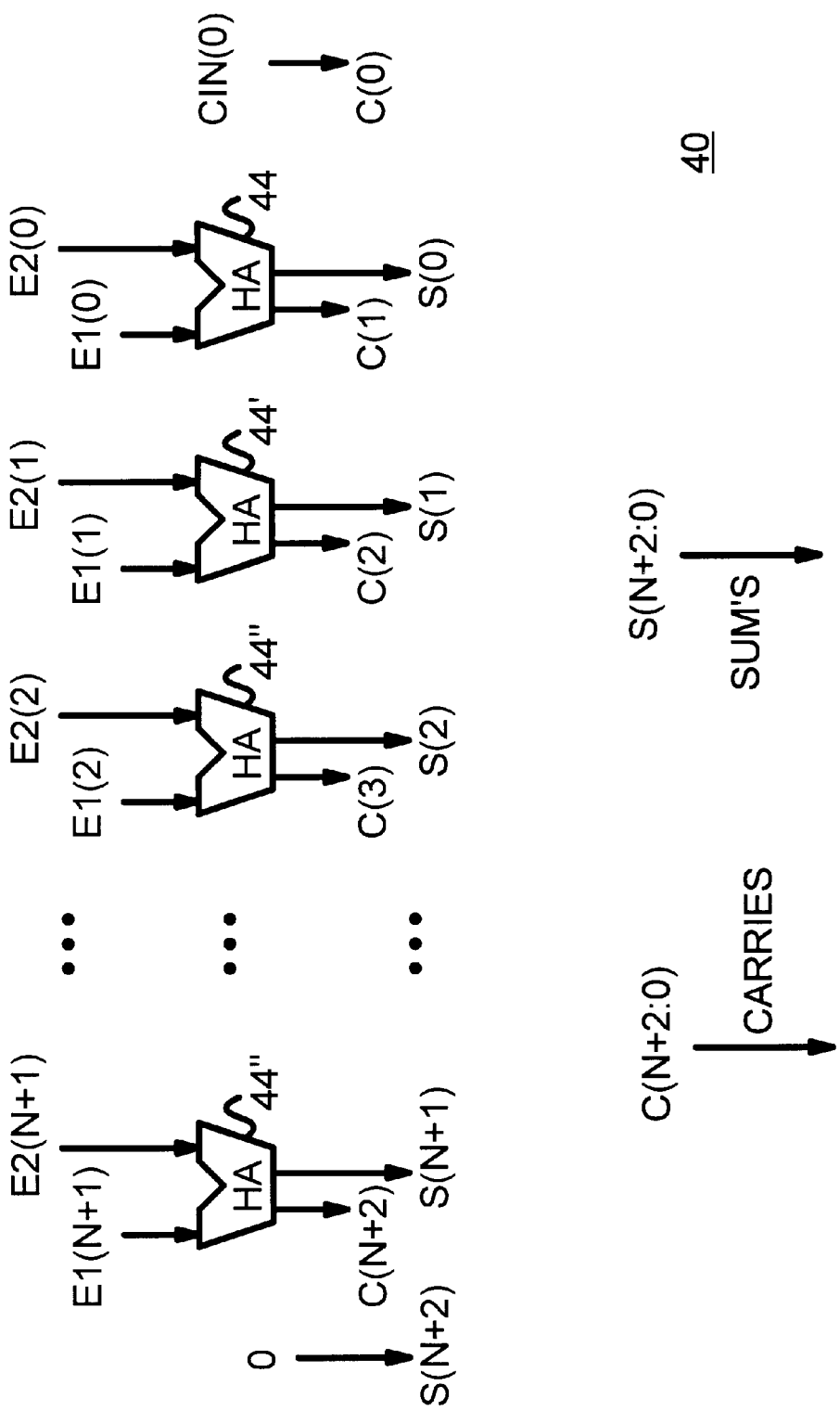
FIG. 6 is a diagram of a half-adder array added to a Sum-of-Absolute-Difference calculator to compensate for a last inversion.

Half-Adder Array Compensates for Last Difference—FIG. 6

FIG. 6 is a diagram of a half-adder array added to a Sum-of-Absolute-Difference calculator to compensate for a last inversion. Each half-adder cell 44 receives 2 inputs for a bit-position i, one input E1(i) from one final adder (58 of FIG. 5) and the other input E2(i) from another final adder (62 of FIG. 5). Each half-adder cell 44 generates a carry output to the next-higher bit position C(i+1) by ANDing the E1(i) and E2(i) inputs: C(i+1)=E1(i) AND E2(i). A simple AND gate can be used. Each half-adder cell 44 also generates a sum output S(i) with an exclusive-OR (XOR) gate: S(i)=E1(i) XOR E2(i).

For bit-position 0, the LSB, half-adder cell 44 receives E1(0) and E2(0), and generates carry C(1) and sum S(0). The carry output is for the next-higher bit position (1). The carry for bit-position 0 is the sign bit from one of the absolute difference circuits, such as the MSB sign bit from subtractor 56 of FIG. 5.

For bit-position 1, half-adder cell 44' receives E1(1) and E2(1), and generates carry C(2) and sum S(1). For bit-position 2, half-adder cell 44" receives E1(2) and E2(2), and generates carry C(3) and sum S(2). Other half-adder cells 44 (not shown) are used for summing other intermediate bit-positions of E1 and E2. Finally, for bit-position n+1, the MSB of the input, half-adder cell 44" receives E1(n+1) and E2(n+1), and generates carry C(n+2) and sum S(n+1). The MSB of the sum, S(n+2), is set to zero.

There is no propagation of carries in half-adder array 40. The separate sum and carry bits for each bit-position are output as 2 numbers to the final adder (30 of FIG. 5). The final adder then adds the sum and carry bit for each bit position, and propagates the carries to produce one final sum, representing the Sum-of-Absolute-Difference for the pairs of pixels.

Since there is no carry propagation within half-adder array 40, propagation delays are small and uniform. Half-adder array 40 can thus be a faster circuit than a full adder such as final adder 30 of FIG. 5.

Figure 7:
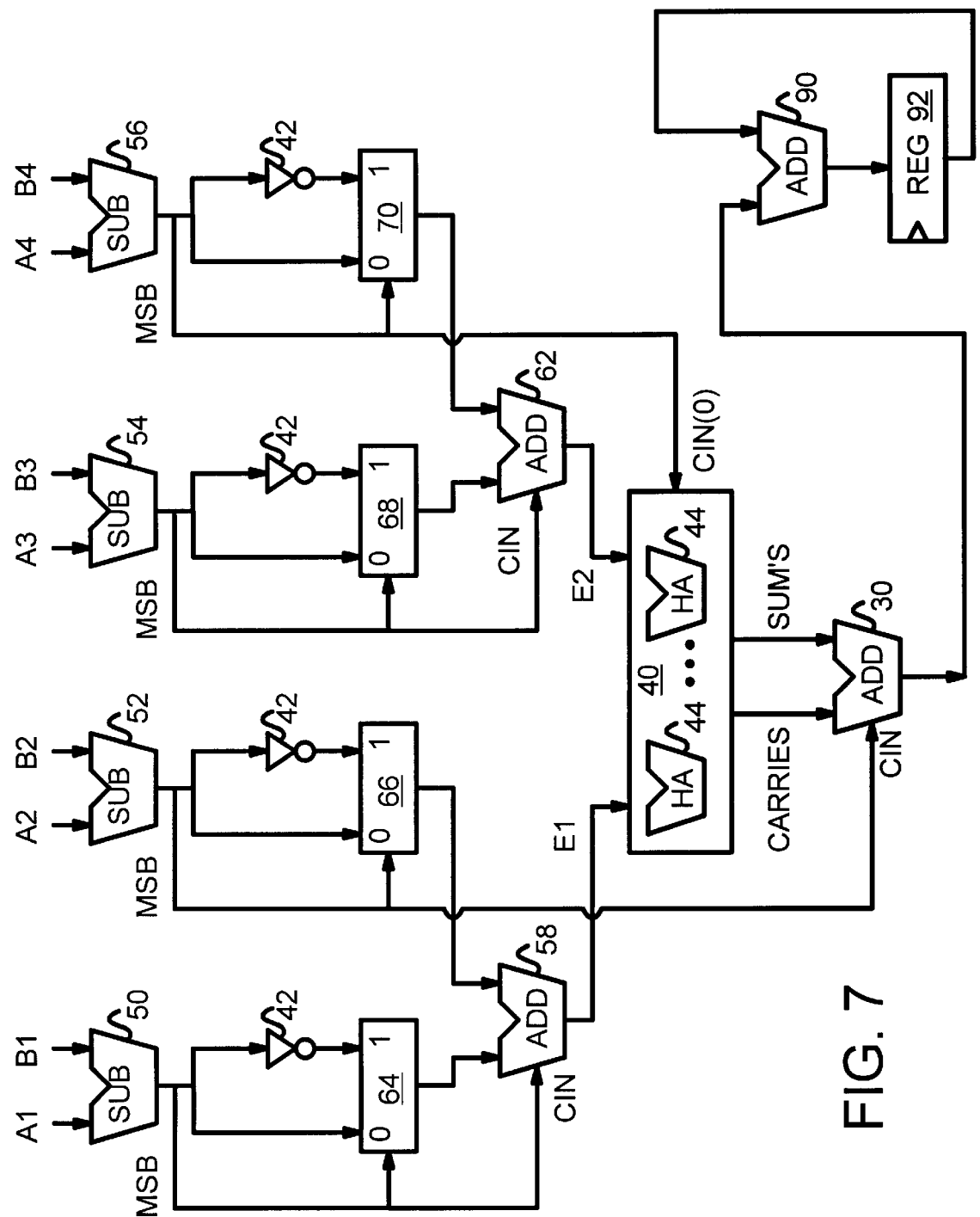
FIG. 7 is a diagram of a Sum-of-Absolute-Difference calculator with an accumulator for comparing larger macroblocks.

Recursive SAD—FIG. 7

FIG. 7 is a diagram of a Sum-of-Absolute-Difference calculator with an accumulator for comparing larger macroblocks. Macroblocks are typically 16×16 pixels, or 256 pixels. The SAD calculator of FIG. 5 compares only 4 pixels at a time. An accumulator can be added to the output of the SAD calculator and the SAD calculator re-used with other pixels for the macroblocks.

The SAD calculator of FIG. 7 operates in the same manner as described earlier for FIG. 5. The final output from final adder 30 is the SAD of the 4 pixel pairs A1, B1, A2, B2, A3, B3, A4, B4. This final SAD is accumulated by accumulating adder 90 into register 92 by adding the previous contents of register 92 to the final SAD from final adder 30.

Register 92 is cleared for the start of each new macroblock comparison. During a first clock cycle, the first four pairs of pixels are applied to inputs A1, A2, A3, A4 and B1, B2, B3, B4. The absolute differences of these 4 pairs of pixels are calculated and summed with carry compensation to the carry-in inputs of final adders 58, 62, 30, and to half-adder array 40. This SAD of the first 4 pixel pairs is loaded into register 92.

During the second clock cycle, a second group of 4 pixel pairs is applied to inputs to subtractors 50–56. Subtractor 50 generates A5-B5, subtractor 52 generates A6-B6, subtractor 54 generates A7-B7, and subtractor 56 generates A8-B8. Negative differences are compensated for by the carry-ins to final adders 58, 62, 30 and to half-adder array 40. The SAD of these next 4 pixel pairs is output by final adder 30 and is adder to the previous SAD in register 92 by accumulating adder 90.

During the third clock cycle, a third group of 4 pixel pairs is applied to inputs to subtractors 50–56. Subtractor 50 generates A9-B9, subtractor 52 generates A10-B10, subtractor 54 generates A11-B11, and subtractor 56 generates A12-B12. Negative differences are again compensated for by the carry-ins to final adders 58, 62, 30 and to half-adder array 40. The SAD of these next 4 pixel pairs is output by final adder 30 and is adder to the accumulated SAD of the first 2 groups in register 92 by accumulating adder 90.

Additional groups of 4 pixel pairs are applied to the inputs of subtractors 50–56 during subsequent clock cycles and accumulated into register 92. For a 16×16-pixel macroblock comparison, a total of 64 groups of 4 pixel-pairs exist, and thus a total of 64 clock cycles and accumulations are needed to fully compare the macroblocks.

Different sizes of macroblocks can be accommodated by using a different number of clock cycles. For a smaller macroblock of 16×8 pixels, only 32 clock cycles are needed.

Figure 8:
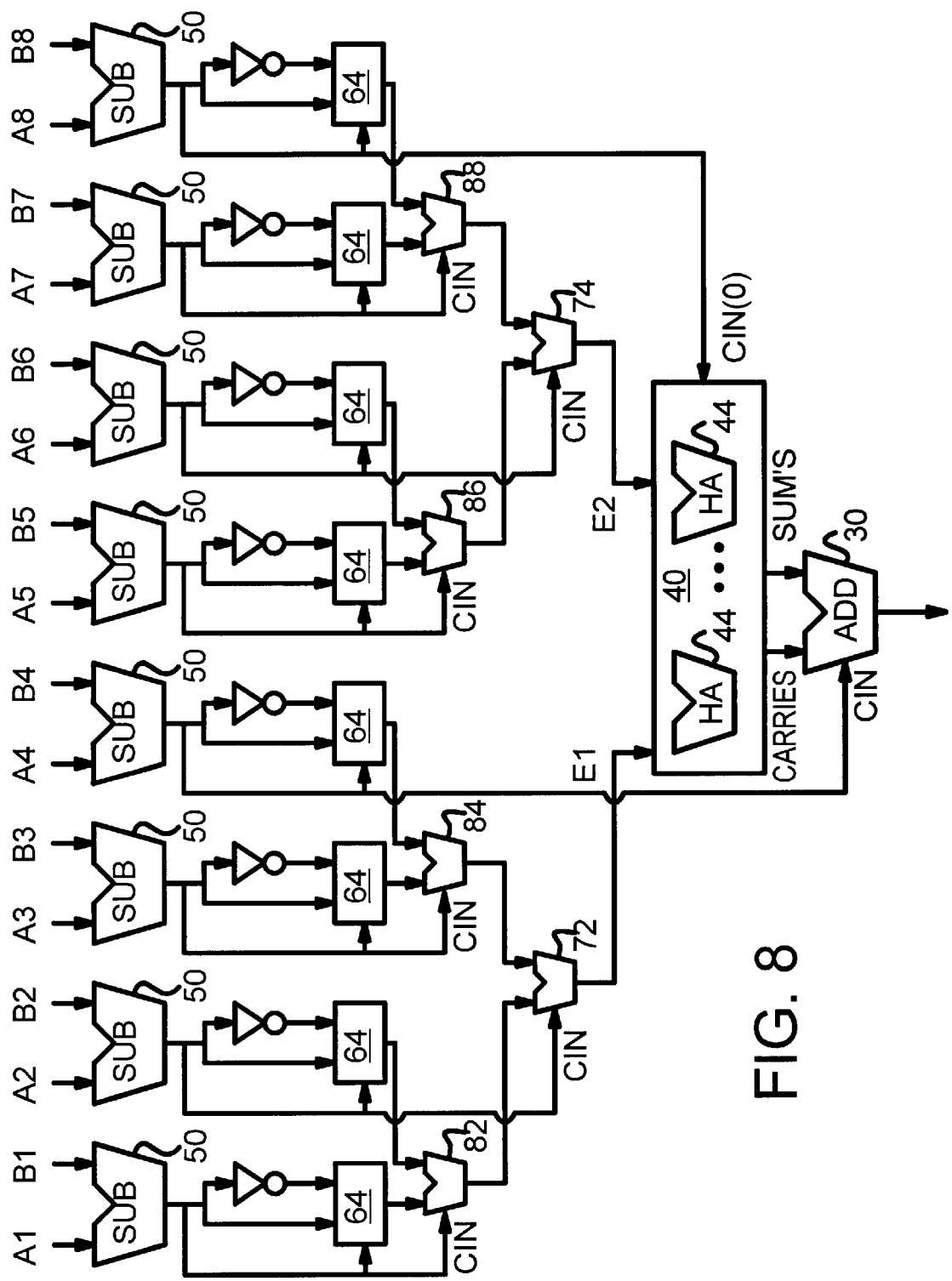
FIG. 8 shows a SAD calculator that calculates the sum of 8 absolute differences in each clock cycle.

8-Wide SAD Calculator—FIG. 8

FIG. 8 shows a SAD calculator that calculates the sum of 8 absolute differences in each clock cycle. Eight subtractors 50 generate 8 differences A1-B1, A2-B2, . . . A7-B7, and A8-B8. The MSB sign bit from each difference controls mux 64 to select the non-inverted difference as the absolute difference when the sign bit is zero, or the bit-wise inverted difference when the sign bit is 1.

An additional layer of final adders is needed to sum the additional 8 differences. Summing adders 82, 84, 86, 88 each sum two differences: summing adder 82 sums A1-B1 and A2-B2, (or the inverses), summing adder 84 sums A3-B3 and A4-B4, etc. The sums from summing adders 82, 84 are combined by second-layer adder 72 to produce sum E1 that is input to half-adder array 40. Likewise, the sums from summing adders 86, 88 are summed together by second-layer adder 74, generating E2 to half-adder array 40. The sums and carries from half-adder array 40 are summed and the caries propagated by final adder 30. The output from final adder 30 is the SAD of 8 pixel pairs.

The MSB sign bits from subtractors 50 are applied to the carry-in inputs of the summing and second-level adders, as well as final adder 30 and half-adder array 40. For example, the sign bit for A1-B1 is applied to the carry-in of summing adder 82, while the sign for A2-B2 is applied to CIN of second-level adder 72. Summing adders 84, 86, 88 receive sign bits for A3-B3, A5-B5, and A7-B7 respectively. Final adder 30 receives the sign bit for A4-B4, while half-adder array 40 receives the sign bit for A8-B8.

A total of seven 2-input adders 82, 84, 86, 88, 72, 74, 30 are needed to sum the 8 differences from muxes 64. Since there are 8 differences, one additional absolute difference must be compensated for using the half-adder array. In general, for k differences of k pairs of pixels, there are k−1 2-input adders in the summing and final stages of the SAD circuit. The last difference is always compensated for by the additional half-adder array.

ADVANTAGES OF THE INVENTION

A sum-of-absolute-difference calculator is used with a video compressor. A dedicated, specialized arithmetic unit generates the sum of absolute differences (SAD) of pixel pairs in 2 macroblocks being compared for motion estimation searches. Logic paths and circuit propagation delays in a SAD calculation circuit are reduced.

Since there is no carry propagation within half-adder array 40, propagation delays are small and uniform. Half-adder array 40 can thus be a faster circuit than a full adder such as final adder 30 of FIG. 5. Since the half-adder array has no carry propagation, it is faster than an incrementer needed for a two's complement generator in the absolute difference circuits.

Since just one half-adder array is needed, regardless of the number of pixel inputs, the amount of logic required is reduced. The single half-adder array and the inverters replace a multi-bit incrementer/inverter negation circuit in each difference circuit. For an 8pixel SAD circuit, 8 multi-bit inverter banks and incrementers are replaced by one half-adder array and 8 banks of inverters. These incrementers are many bits wide, being as wide as the absolute differences. Thus the logic reduction is significant. The logic reduction is proportionally greater as more pixel pairs are simultaneously compared. The logic reduction also results in power reduction.

ALTERNATE EMBODIMENTS

Several other embodiments are contemplated by the inventor. For example different numbers of pixel pairs can be compared. Different bit widths for the pixels can be used. For lower-quality, higher compression ratio video sequences, fewer bits can be used per pixel. Rather than use full-color pixels, mono-color pixels can be used for motion estimation.

Of course, half, double, or higher frequency clocks can be used and the SAD calculator can be divided into pipeline stages. The SAD calculator can be implemented with random-logic gates or macro cells. Many variations in implementation are possible. Various pixel encodings such as RGB or YUV can be used. More intelligent and complex criteria can be used in addition to SAD to select the best-match motion vectors. The carry input to the accumulating adder can be used to compensate one inversion, eliminating the half-adder array.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A Sum-of-Absolute-Difference (SAD) calculator comprising:
   a plurality of k pixel-pair inputs, each pixel-pair input including a first pixel input receiving a first pixel from a first macroblock and a second pixel input receiving a second pixel from a second macroblock;
   a plurality of k subtractors, each subtractor generating a difference by subtracting a numeric value of the second pixel from a numeric value of the first pixel;
   a plurality of k inverter banks, each inverter bank coupled to the difference from one of the k subtractors, for generating bit-inverted differences;
   a plurality of k muxes, each mux receiving a difference from one of the k subtractors and receiving a bit-inverted difference from an inverter bank that receives the difference;
   a sign bit for each difference generated by each subtractor, the sign bit indicating when a difference represents positive or a negative value;
   each mux in the plurality of muxes being controlled by a sign bit for the difference input to the mux, each mux outputting the difference when the sign bit indicates that the difference represents a positive value, but each mux outputting the bit-inverted difference when the sign bit indicates that the difference represents a negative value;
   a plurality of k–2 summing adders, each summing adder having 2 multi-bit inputs and a single-bit carry input; wherein a first level of the summing adders receive outputs from the plurality of muxes, the plurality of summing adders outputting a first partial sum and a second partial sum;
   wherein each of the k–2 summing adders receives as the single-bit carry input a sign bit for a different one of the differences, wherein the k–2 summing adders compensate for bit-wise inversion rather than 2's complementing of all but 2 of the differences;
   a half-adder array, receiving the first and second partial sums from the plurality k–2 summing adders, for generating a sum and a carry bit for each bit position by adding each bit position of the first partial sum to a same bit position of the second partial sum, the half-adder array outputting all sum bits as a sums output and all carry bits as a carries output; and
   a final adder, having 2 multi-bit inputs and a single-bit carry input, receiving the sums output and the carries output from the half-adder array, the final adder receiving at the single-bit carry input the sign bit for a difference generated by one of the k subtractors, the final adder for summing the sum and carry bits output by the half-adder array with the sign bit and for propagating carries to generate a SAD value, the SAD value being a sum of absolute-values of the differences generated by the k subtractors,
   whereby the k–2 summing adders compensate for bit-wise inversion rather than 2's complementing of all but 2 of the differences, while the final adder and the half-adder array compensate for a remaining 2 of the differences.

2. The SAD calculator of claim 1 wherein the half-adder array does not propagate carries among bit positions but merely outputs carries to the final adder,
   whereby carries are propagated by the final adder but not by the half-adder array.

3. The SAD calculator of claim 2 wherein the half-adder array has a faster propagation delay than does the final adder.

4. The SAD calculator of claim 3 wherein the half-adder array comprises a plurality of half-adder cells, each half-adder cell being unconnected to other half-adder cells,
   whereby half-adder cells operate independently of other half-adder cells.

5. The SAD calculator of claim 2 wherein the half-adder array comprises a plurality of half-adder cells, each half-adder cell generating a carry output for a next-higher bit-position as an AND of a current bit-position of the first and second partial sums, each half-adder cell generating a sum output for the current bit-position as a exclusive-OR (XOR) of the current bit-position of the first and second partial sums,
   whereby half-adder cells AND and XOR bits.

6. The SAD calculator of claim 2 wherein for each pixel-pair input, the first pixel is at a first relative location within the first macroblock and the second pixel is at a second relative location within the second macroblock;
   wherein the first and second relative locations are a same relative location within a macroblock.

7. The SAD calculator of claim 6 wherein k is at least 3.

8. The SAD calculator of claim 7 wherein k is 4 or 8.

9. The SAD calculator of claim 2 further comprising:
   a register for storing an accumulated SAD value; and
   an accumulating adder, receiving the SAD value from the final adder, for adding the SAD value to the accumulated SAD value to generate a new SAD value, the new SAD value being stored into the register as the accumulated SAD value for a next clock cycle,
   whereby SAD values are accumulated over several clock cycles.

10. The SAD calculator of claim 9 wherein a different group of pixel pairs from the first and second macroblocks are applied to the plurality of k pixel-pair inputs for each clock cycle, until all pixels in the first macroblock have been compared;
    wherein the accumulated SAD value in the register is read after all pixels in the first macroblock have been input to the plurality of k pixel-pair inputs,
    whereby a macroblock is compared and the SAD values accumulated over several clock cycles.

11. The SAD calculator of claim 10 wherein many different second macroblocks are compared over many clock cycles;
    wherein a second macroblock with a lowest accumulated SAD value is selected for generating a best-fit motion vector;
    wherein the best-fit motion vector is a difference in absolute locations of pixels in a pixel pair between the first and second macroblocks.

12. The SAD calculator of claim 10 wherein each macroblock has 16×16 pixels.

13. The SAD calculator of claim 12 wherein k is 8 and wherein the register is read after 32 clock cycles.

14. A Sum-of-Absolute-Difference SAD generator for motion estimation comprising:

difference generators, each receiving a pair of corresponding-location pixels, for generating a difference and a bit-inverted difference, each difference generator outputting a most-significant-bit (MSB) of the difference as a compensation bit;

summing adders, each having 2 multi-bit inputs and a carry input, for generating a first and a second partial sum of the difference or bit-inverted differences output from the difference generators;

wherein all but two of the compensation bits from the difference generators are applied to the carry inputs of the summing adders, the summing adders adjusting to a 2's complement of the bit-inverted differences for all but two of the difference generators;

a half-adder array, receiving the first and second partial sum from the summing adder, and receiving the compensation bit from one of the difference generators, for generating sum and carry bits for each bit position, but not propagating carries; and a final adder, receiving the sum and carry bits from the half-adder array, and receiving the compensation bit from one of the difference generators, for generating a final output, the final output being a Sum-of-Absolute-Difference of the corresponding-location pixels input to the difference generators, whereby compensation for bit-inversion rather than 2's complementation is accomplished by carry inputs to the summing adders, the final adder, and to the half-adder array.

15. The SAD generator of claim 14 wherein each difference generator comprises:

a subtractor for subtracting one pixel value from another pixel value in the pair of corresponding-location pixels to generate the difference;

inverters, coupled to all bits of the difference except the MSB output as the compensation bit, for generating the bit-inverted difference;

a selector, coupled to the inverters and to the subtractor, having a control input coupled to the compensation bit, for outputting the difference when the compensation bit is in a positive state but for outputting the bit-inverted difference when the compensation bit is in a negative state, whereby the difference generator generates a positive or a bit-inverted difference but not an absolute difference.

16. The SAD generator of claim 15 wherein the selector does not output the MSB of the difference, whereby the MSB from the subtractor is truncated by the selector.

17. The SAD generator of claim 16 wherein the half-adder array comprises independent half-adder cells each containing an AND gate to generate a carry bit and an XOR gate to generate a sum bit.

18. The SAD generator of claim 17 wherein the compensation bit input to the half-adder array is output to the final adder as a carry bit to a least-significant-bit (LSB) position.

19. A Sum-of-Absolute-Difference (SAD) calculator comprising:

k pixel-pair inputs, each pixel-pair input including a first pixel input receiving a first pixel from a first macroblock and a second pixel input receiving a second pixel from a second macroblock;

k subtractor means, each subtractor means for generating a difference by subtracting the second pixel from the first pixel;

inverter means, coupled to the difference from one of the k subtractor means, for generating bit-inverted differences;

k mux means, each mux means receiving a difference from one of the k subtractor means and receiving a bit-inverted difference from an inverter means that receives the difference;

sign means for each difference generated by each subtractor means, the sign means indicating when a difference represents positive or a negative value;

each mux means being controlled by a sign means for the difference input to the mux means, each mux means outputting the difference when the sign means indicates that the difference represents a positive value, but each mux means outputting the bit-inverted difference when the sign means indicates that the difference represents a negative value;

k–2 summing adder means, each summing adder means having 2 multi-bit inputs and a single-bit carry input; wherein a first level of the summing adder means receive outputs from the mux means, the summing adder means outputting a first partial sum and a second partial sum;

wherein each of the k–2 summing adder means receives as the single-bit carry input a sign means for a different one of the differences, wherein the k–2 summing adder means compensate for bit-wise inversion rather than 2's complementing of all but 2 of the differences;

a half-adder array means, receiving the first and second partial sums from the k-2 summing adder means, for generating a sum and a carry bit for each bit position by adding each bit position of the first partial sum to a same bit position of the second partial sum, the half-adder array means outputting all sum bits as a sums output and all carry bits as a carries output; and a final adder means, having 2 multi-bit inputs and a single-bit carry input, receiving the sums output and the carries output from the half-adder array means, the final adder means receiving at the single-bit carry input the sign means for a difference generated by one of the k subtractor means, the final adder means for sunning the sum and carry bits output by the half-adder array means with the sign means and for propagating carries to generate a SAD value, the SAD value being a sum of absolute-values of the differences generated by the k subtractor means, whereby the k–2 summing adder means compensate for bit-wise inversion rather than 2's complementing of all but 2 of the differences, while the final adder means and the half-adder array means compensate for a remaining 2 of the differences.

20. The SAD calculator of claim 19 wherein the half-adder array means does not propagate carries among bit positions but merely outputs carries to the final adder means, whereby carries are propagated by the final adder means but not by the half-adder array means.

* * * * *